(No Model.) 2 Sheets—Sheet 2.

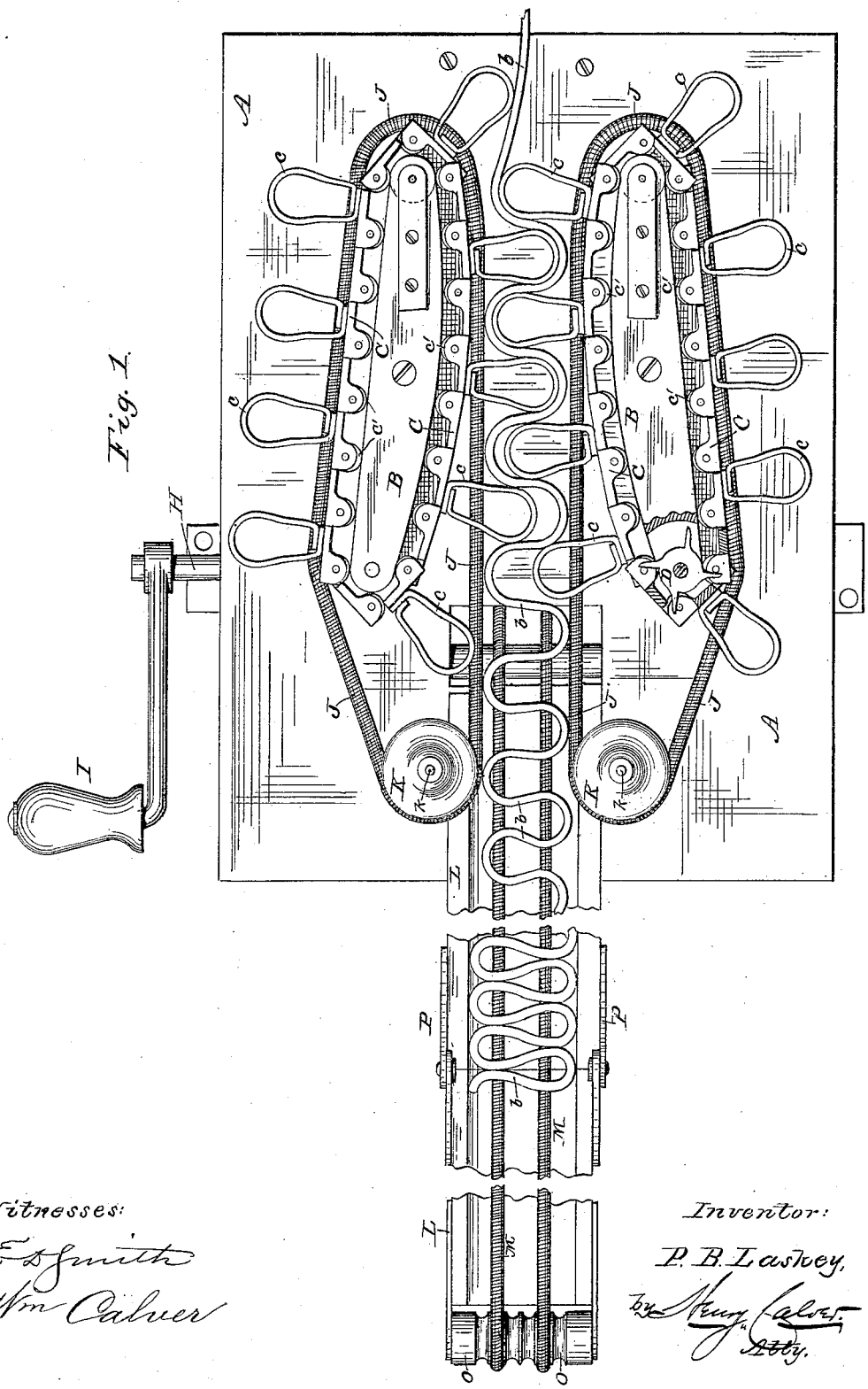

P. B. LASKEY.
CANDY CRIMPING MACHINE.

No. 337,509. Patented Mar. 9, 1886.

Witnesses:
E. D. Smith
Wm Calver

Inventor:
P. B. Laskey,
by Henry Calver
Atty.

UNITED STATES PATENT OFFICE.

PHILIP B. LASKEY, OF MARBLEHEAD, MASSACHUSETTS.

CANDY-CRIMPING MACHINE.

SPECIFICATION forming part of Letters Patent No. 337,509, dated March 9, 1886.

Application filed November 24, 1885. Serial No. 183,890. (No model.)

*To all whom it may concern:*

Be it known that I, PHILIP B. LASKEY, a citizen of the United States, residing at Marblehead, in the county of Essex and State of Massachusetts, have invented certain new and useful Improvements in Candy-Crimping Machines, of which the following is a specification, reference being had therein to the accompanying drawings.

My invention relates to that class of machines used for crimping or folding long thin strips of candy into a series of oppositely-disposed folds, the object of my invention being to obviate certain difficulties existing in the machines for this purpose heretofore in use.

To this end my invention consists in certain improved constructions and mechanical combinations, as will be hereinafter described and fully indicated.

Figure 3:
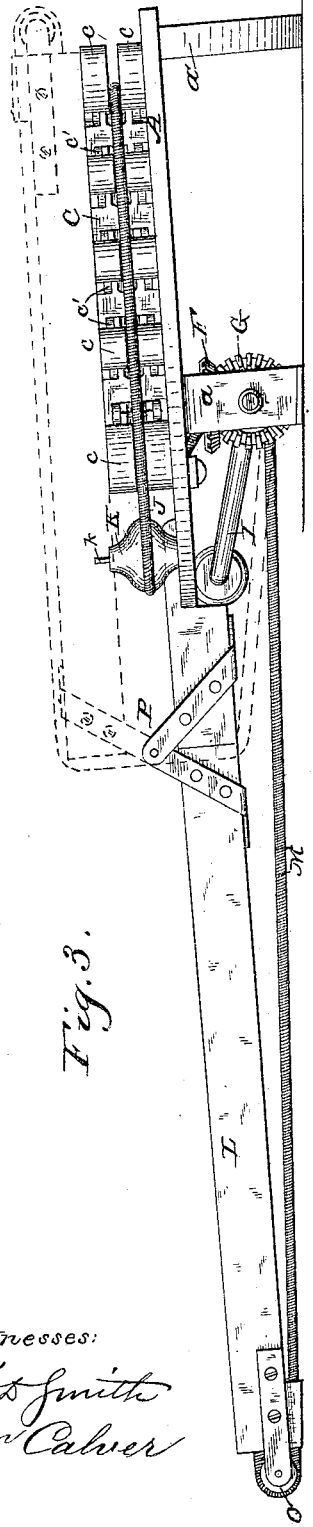
Figure 2:
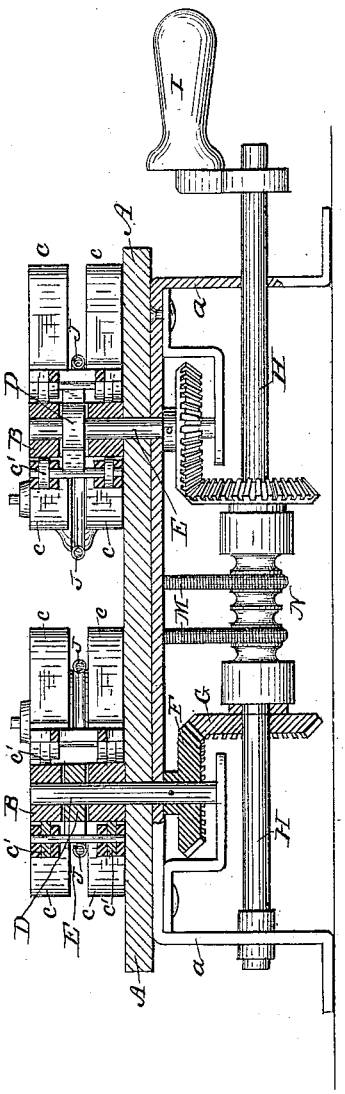

In the accompanying drawings, Figure 1 is a plan view of a machine embodying my invention. Fig. 2 is a cross-section of the same, and Fig. 3 is a side view on a somewhat smaller scale than the other figures.

A denotes the main plate or platform of the machine, to which are attached two blocks, B, which serve as guides for two endless chains, C, provided with intermeshing teeth or loops $c$. The guiding-blocks B are a sufficient distance apart so that the teeth or loops $c$ on one chain will not reach to the bottoms of the teeth or loops in the other chain. The chains C are provided (preferably at each link or joint) with anti-friction rollers or wheels $c'$, running against the guides B, said chains being rotated by sprocket-wheels D, carried by vertical shafts E, to which are attached beveled gears F, gearing with similar gears, G, on the driving-shaft H, the latter having an operating crank or handle, I. In the form of machine herein shown the shaft H is journaled in brackets $a$, which, with the post $a'$, serve to support the main plate or platform A. Thus it will be apparent that as the shaft H is rotated the endless chains C will be caused to travel around the guides B, causing the teeth or loops $c$ on the adjacent sides of said guides to intermesh, so that the strips of warm and soft candy $b$ passing between said teeth or loops will be crimped or folded as shown. As the crimped candy will be held by several pairs of these teeth or loops at one time, it will become properly set and sufficiently cooled before leaving the crimpers, so that it will retain the shape given it thereby.

The guides or supports B are preferably arranged, as shown in Fig. 1, so that their delivery ends are more widely separated than their entering ends, and thus the intermeshing teeth or crimpers $c$ will meet on the arc of a comparatively small circle, and will part on the arc of a larger circle. By this arrangement of the said teeth or loops it will result that the entering warm strip of candy will be quickly crimped without liability of stretching or breaking by the said teeth or loops as they come together; but the crimped strip will be more slowly disengaged therefrom as the said teeth or loops recede from each other toward the outwardly-inclined ends of the guides B before they finally pass around the ends of the latter. Thus the crimped candy will have time to cool somewhat while passing through the crimpers, and will be gradually disengaged therefrom as the said crimpers are separated by the inclined guides B.

To insure the disengagement of the crimped candy from the crimping teeth or chains, I prefer to make slots or recesses in the said teeth or to use pairs of teeth which are side by side, but slightly separated from each other, so as to admit of the use of strippers for positively removing the crimped candy from the crimpers as the latter recede from each other in their rotary movements around the guides B. In the form of my invention herein shown these strippers consist of endless bands J, preferably of closely-coiled wire, said bands passing around pulleys K, turning on pins $k$ attached to the platform A, and around the entering ends of the chains C, thereby receiving movement from and rotating with said chains. These stripping-bands lie close to chains at the ends of the latter at which the candy enters, and being at the bottoms of the slotted or separated crimping-teeth C they do not interfere with the action of the latter in crimping the candy; but as the said teeth diverge from each other toward the delivery ends of the chains (owing to the inclined positions or divergence of the guides B around which said chains pass) the candy, should it stick to the crimping-teeth, is positively removed therefrom by the strippers or stripping bands which extend in a straight line some distance forward of the delivery ends of the chains before passing around the pulleys K. It is obvious that these strippers would work equally as well if used with the crimping-wheels heretofore in use—such, for example, as are shown by Patent No. 289,488, December 4, 1883, to L. T. Yoder—if the teeth of the said crimping-wheels were slotted for the reception of the strippers, and I do not therefore wish to be understood as limiting my invention to the use of my strippers with the endless crimping-chains herein shown, as these strippers would prove equally useful with other forms of rotary crimpers; neither do I wish to be understood as limiting my invention to the rotary or moving strippers herein shown, as stationary rods or bars may be used to strip the candy from the rotary crimpers, as I have demonstrated by experiment; but I prefer the rotary or traveling strippers, as they work more satisfactorily.

L denotes a trough or guideway, into which the candy passes from the crimpers; and to insure the proper movement of the crimped candy in the said trough or guideway, or to prevent the candy from backing up, I prefer to employ one or more endless carriers or carrying-bands, M, running over and receiving movement from a grooved roller, N, on the driving-shaft H, and also passing over a grooved roller, O, at the lower or forward end of the trough L. These endless carriers may be made elastic or of closely-coiled wire, like the strippers J, so that when the trough L, which is preferably made in two sections connected by a hinge, P, is folded over, as indicated by dotted lines in Fig. 3, the bands will contract and remain in place. The hinged trough is thus folded over, so that the machine will occupy but comparatively little room when not in use or during transportation.

The roller N, from which the endless carriers receive their movement, is of lesser diameter than the gears and sprocket-wheels by which the endless crimping-chains C are rotated, so that said carriers will move more slowly than the said chains. As the candy first emerges from the crimpers at the delivery end of the latter, the folds thereof are quite open, as indicated in Fig. 1, but being crowded forward by the crimpers onto the more slowly moving endless carriers, the folds of the candy will be closed up somewhat to bring it more nearly to its final shape than it would be if the folds were left open.

From the foregoing it will be apparent that my machine will "set" the crimped candy better than machines using ordinary crimping-wheels when running at the same speed, or may be run more rapidly than the old machines and still set the crimped candy equally well; also, that in my machine the candy is always positively disengaged from the crimpers by the strippers, whatever may be the speed of the machine, and that all annoyance caused by the candy sticking to the crimpers is avoided; also, that the crimped candy will be properly conveyed away from the crimpers, and at the same time will be folded more closely together than when first crimped, all of these operations combining to render my machine more satisfactory in its operation than other machines for the same purpose heretofore employed.

Having thus described my invention, I claim and desire to secure by Letters Patent—

1. In a candy-crimping machine, the combination, with suitable operating mechanism, of a pair of rotary endless chains provided with intermeshing teeth or crimpers, substantially as set forth.

2. In a candy-crimping machine, the combination, with a pair of rotary endless chains provided with intermeshing teeth or crimpers, of guides or supports around which said chains rotate, said guides or supports being arranged to diverge from each other at the delivery ends of the chains, so that the crimpers will come together on the arc of a comparatively-small circle, and will diverge or part on the arc of a larger circle, substantially as set forth.

3. In a candy-crimping machine, the combination, with a pair of rotary crimpers, of a pair of strippers for insuring the removal of the crimped candy from the said crimpers, substantially as set forth.

4. In a candy-crimping machine, the combination, with a pair of rotary crimpers, of a pair of rotary strippers moving therewith and serving to insure the removal of the crimped candy from the said crimpers, substantially as set forth.

5. In a candy-crimping machine, the combination, with the endless rotary crimpers, of a trough or guideway for receiving the crimped candy, substantially as set forth.

6. A candy-crimping machine provided with a hinged trough or guideway capable of being folded when the machine is not in use, substantially as set forth.

7. The combination, with a pair of rotary crimpers, of an endless carrier or carriers for removing the candy from the said crimpers, substantially as set forth.

8. The combination, with a pair of rotary crimpers, of one or more endless carriers having a movement slower than the crimpers, substantially as set forth.

9. The combination, with the endless rotary crimpers, of the strippers and endless carriers, substantially as set forth.

10. The combination, with the rotary crimpers, of the trough or guideway and the endless carriers, substantially as set forth.

11. The combination, with the rotary crimpers, of the strippers, the trough or guideway, and the endless carriers, substantially as set forth.

12. The combination, with the guiding-blocks

B, of the endless chain C, provided with antifriction wheels $c'$ and crimping-teeth $c$, substantially as set forth.

13. The combination, with the frame or platform A, having brackets $a$, of the driving-shaft H, having gears G, the vertical shafts E, having gears F and sprocket-wheels D, the endless chains C, having crimping teeth or loops $c$, and the guiding-blocks B, substantially as set forth.

14. The combination, with the driving-shaft H, having the grooved roller N, of the trough L, having the grooved roller O, and the endless carriers M, running over said rollers, substantially as set forth.

In testimony whereof I affix my signature in presence of two witnesses.

PHILIP B. LASKEY.

Witnesses:
FRANK L. FABENS,
JOHN DIXIE.